United States Patent [19]
Revyn

[11] Patent Number: 5,285,874
[45] Date of Patent: Feb. 15, 1994

[54] COMPOSITE BRAKE DRUM WITH IMPROVED LOCATING MEANS FOR REINFORCEMENT ASSEMBLY

[75] Inventor: Ronald M. Revyn, Roseville, Mich.

[73] Assignee: The Budd Company, Troy, Mich.

[21] Appl. No.: 901,256

[22] Filed: Jun. 19, 1992

[51] Int. Cl.⁵ .............................................. F16D 65/10
[52] U.S. Cl. ................................ 188/218 R; 267/164; 164/112
[58] Field of Search ................... 188/218 R, 17, 18 R, 188/26, 255; 164/111, 112; 192/107 M; 267/158, 159, 164

[56] References Cited

U.S. PATENT DOCUMENTS

| | | | |
|---|---|---|---|
| 2,630,643 | 3/1953 | Smithson et al. | 267/164 X |
| 4,858,731 | 8/1989 | Bush | 188/218 R |
| 5,106,586 | 4/1992 | Muszak et al. | 267/158 X |
| 5,115,891 | 5/1992 | Raitzer et al. | 188/218 R |

Primary Examiner—Robert J. Oberleitner
Assistant Examiner—Josie A. Ballato
Attorney, Agent, or Firm—Harness, Dickey & Pierce

[57] ABSTRACT

A composite brake drum particularly adapted for motor vehicle applications. The brake drum includes a reinforcement assembly embedded within the cylindrical portion of the drum. The reinforcement assembly is preferably made from steel wire stock and includes a plurality of circular rings or loops spaced axially within the brake drum cylindrical portion. Axially extending locator wires are mechanically fastened to the reinforcing loops and serve to locate the loops. End portions on the locator wires contact only one of the mold halves forming the mold cavity and enable the device to be essentially self-locating without crossing the parting line of the mold. The end portion of the locator wires contacting the radially outer side of the mold cavity is formed with a spring bar to enable the locator wires to move outward as the reinforcing loops are thermally expanded during the casting process. By not crossing the parting line, the position of the loops is maintained within acceptable tolerance limits from the finished friction surface of the drum. The composite brake drum is fabricated by pouring molten iron into the mold and then performing finish machining operations.

11 Claims, 3 Drawing Sheets

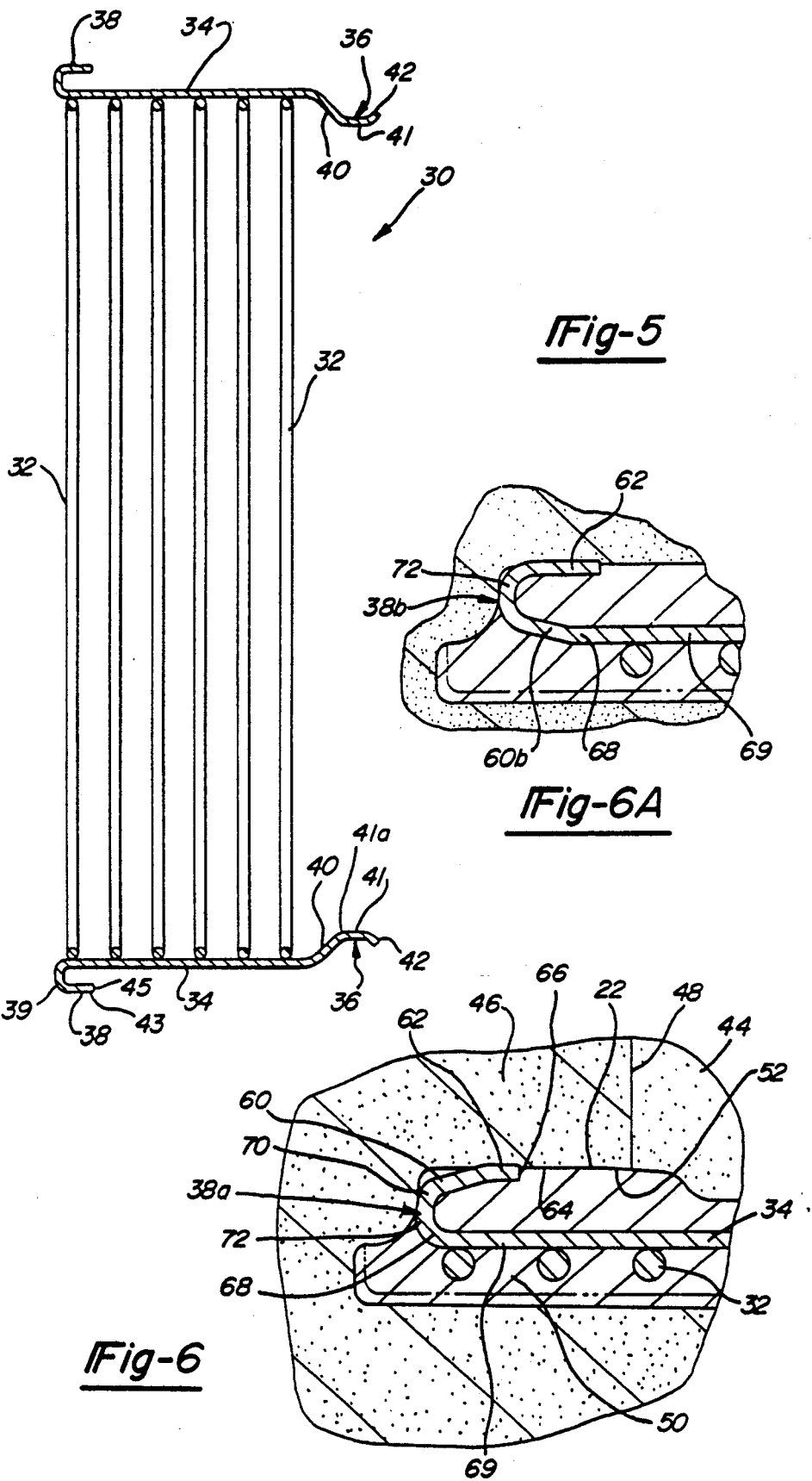

COMPOSITE BRAKE DRUM WITH IMPROVED LOCATING MEANS FOR REINFORCEMENT ASSEMBLY

BACKGROUND AND SUMMARY OF THE INVENTION

This invention relates to a brake drum particularly adapted for motor vehicles and being reinforced with an embedded reinforcement member to provide a composite structure.

Brake drums used for motor vehicles such as heavy duty trucks are typically formed by casting grey iron and machining the casting in areas where precision dimensions and surfaces are required. Although iron brake drums perform satisfactorily, designers of braking systems are constantly striving for enhanced performance, lower cost, increased fatigue life and lighter weight. One particular shortcoming of conventional all-iron drums is their susceptibility to heat checking and crack formation which can ultimately lead to failure of the drum.

As a means for providing an improved brake drum, composite structures are known in which steel is incorporated into an iron brake drum for reinforcement. The brake drum according to U.S. Pat. No. 4,858,731, which is commonly assigned to the assignee of the present invention, employs a cage-like reinforcement assembly made from steel wire which is cast in place to be substantially embedded within a grey iron brake drum. Locating wires are provided to position the reinforcement structure with respect to the mold cavity during casting. Since the steel material of the reinforcing assembly has a considerably higher modulus of elasticity than grey iron, the reinforcement increases the strength of the composite drum structure, thus decreasing mechanical deflection in response to loading. Although this brake drum makes improvements over previous drums, the locator wires of the reinforcement structure locate on both of the two mold halves when positioning the reinforcement structure. In this regard, the locator wires cross the parting line of the mold and present problems in terms of maintaining tolerances in the positioning of the reinforcement structure relative to the machined, loading or friction surface of the drum.

Additionally, the interior ends of the locator wires were required to have precise diameters in that this end was required to contact both mold halves. Furthermore, Applicant's prior design tended to cause sand from the casting molds to be scraped free as the two mold halves are put together, leading to imperfections in the final product.

Furthermore, the outer ends of the locator wires were rigidly positioned radially in the casting mold. During casting, as the reinforcement rings enlarge due to thermal expansion, the reinforcement rings would tend to bulge outward radially between the locator wires resulting in an uneven spacing of the reinforcement wires from the machined friction surface of the brake drum.

In accordance with this invention, an improved composite brake drum is provided which exhibits a number of significant benefits over previous cast brake drums. The brake drum according to this invention employs a cage-like reinforcement assembly, preferably made from steel wire, which is cast in place to be substantially embedded within a grey iron brake drum. Specifically, the present invention offers an improvement in the locating and positioning of the reinforcement assembly relative to the machined, loading or braking surface of the drum. The locating means of the present invention accurately positions the reinforcement assembly with respect to one mold half during casting and therefore, neither crosses the parting line of the mold nor requires spanning the separation of the mold halves at the locating end. Thus, properly positioned, the reinforcement assembly eliminates the tolerance problems which lead to reduced drum life.

The locating means also allows for easy reforming and fine tuning of the reinforcement assembly prior to mounting within the mold. This further assures accurate positioning of the reinforcement assembly.

The present invention is additionally beneficial in that it allows green casting sand, which has been scraped or dislodged from the mold during positioning of the reinforcement assembly, to be cleared from the mold cavity before the mold is closed for actual casting. With the present reinforcement assembly contacting only one mold half, upon closing of the mold, additional casting sand will not be scraped from the second mold and the mold cavity will remain free from contaminants, upon closing of the mold. With the free or loose sand removed, the porosity of the casting is reduced and the strength of the drum proportionally increased.

The reinforcement assembly also reduces the generation of surface checks and cracks which can propagate and ultimately cause mechanical failure of the brake drum. The increased strength of the composite further enables a reduction in the quantity of iron that is required to produce a brake drum of given strength, thus resulting in a lighter weight brake drum structure. The reinforcement assembly further results in the reinforcing sections being positioned close to the machined friction surfaces of the drum within tolerances required for the most advantageous structural efficiency. The axial aspect of the reinforcing assembly serves to reinforce the brake drum across the entire depth of the friction surface. Significantly, the composite brake drum according to this invention can be fabricated using conventional sand casting processes with minimal variations, thus saving the cost of retooling. Due to the fact that the metal reinforcing sections of this invention are distributed, relatively small diameter wires can be used which in turn enable the wires to be rapidly heated to temperatures near those of the molten iron being poured into the casting mold. Thus, good fusion between the iron and embedded steel reinforcement is promoted and casting cycle time is reduced.

To overcome the problem of uneven spacing of the reinforcement rings caused by thermal expansion, the one end of the locator wires responsible for positioning of the reinforcement structure relative to the radially outer surface of the mold cavity is formed with a spring section. This allows the locator wires to move radially outwardly and the reinforcement rings to expand radially outwardly at the location of the locator wires as well as circumferentially therebetween. The result is a circumferentially even movement of the rings radially in response to thermal expansion. Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 5 is a cross-sectional view taken along line 5—5 of FIG. 4 showing a reinforcement structure embodying the principles of the present invention;

FIG. 6 is a cross-sectional view showing a portion of a reinforcement structure of an alternative embodiment within a sand casting mold; and FIG. 6a is an elevational view of one end of a locator wire of an alternative embodiment.

DETAILED DESCRIPTION OF THE INVENTION

Figure 1:
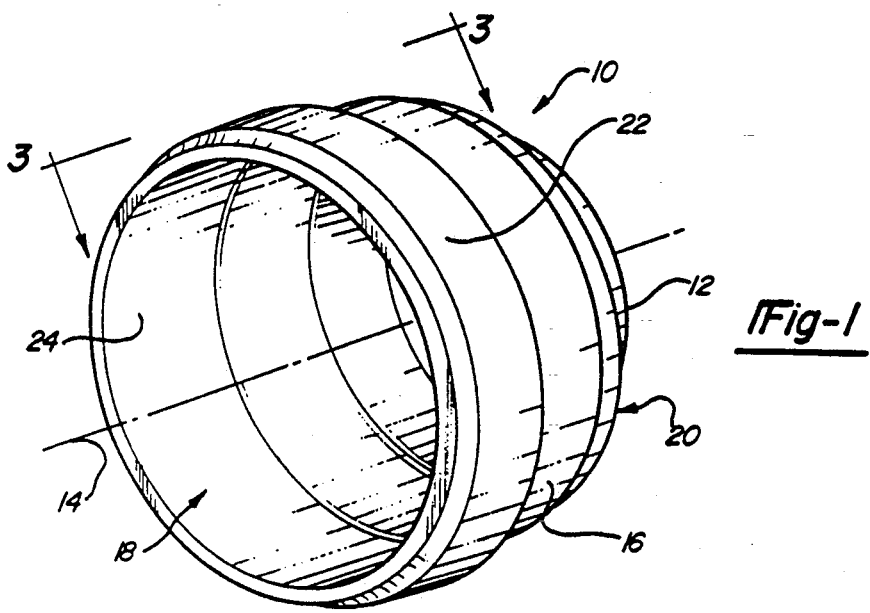
FIG. 1 is a perspective view of a composite motor vehicle brake drum structure constructed in accordance with this invention.
Figure 2:
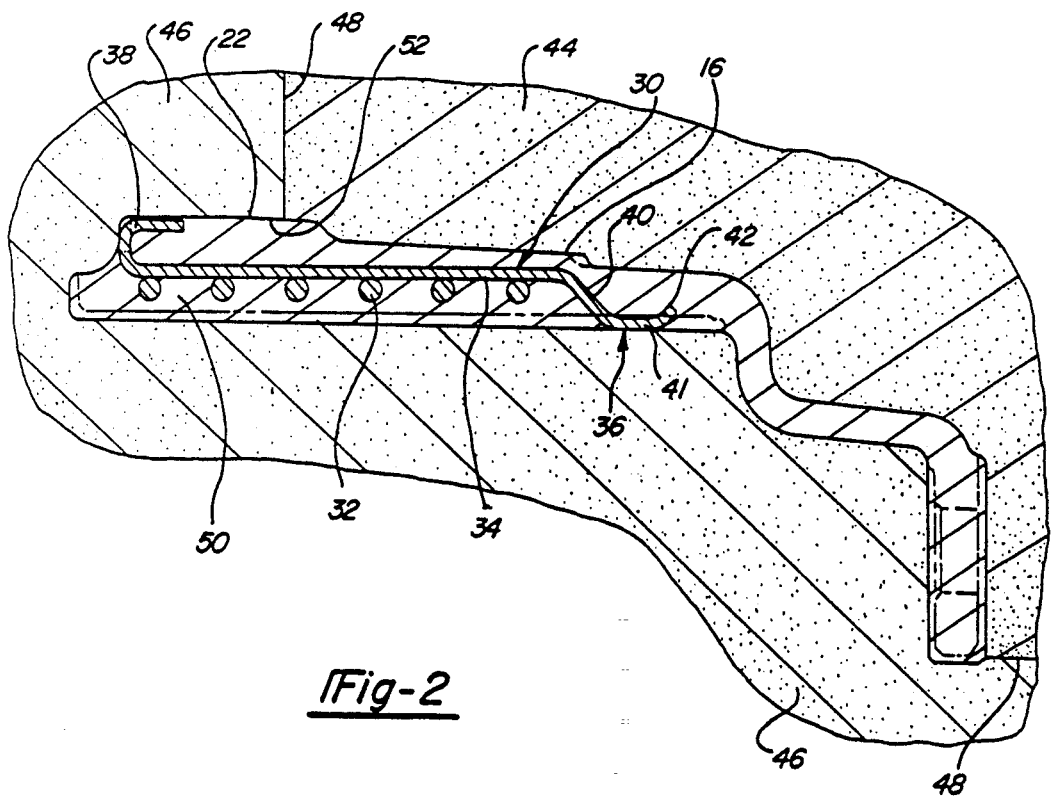
FIG. 2 is a cross-sectional view generally showing a portion of the brake drum as it is formed through casting processes.
Figure 3:
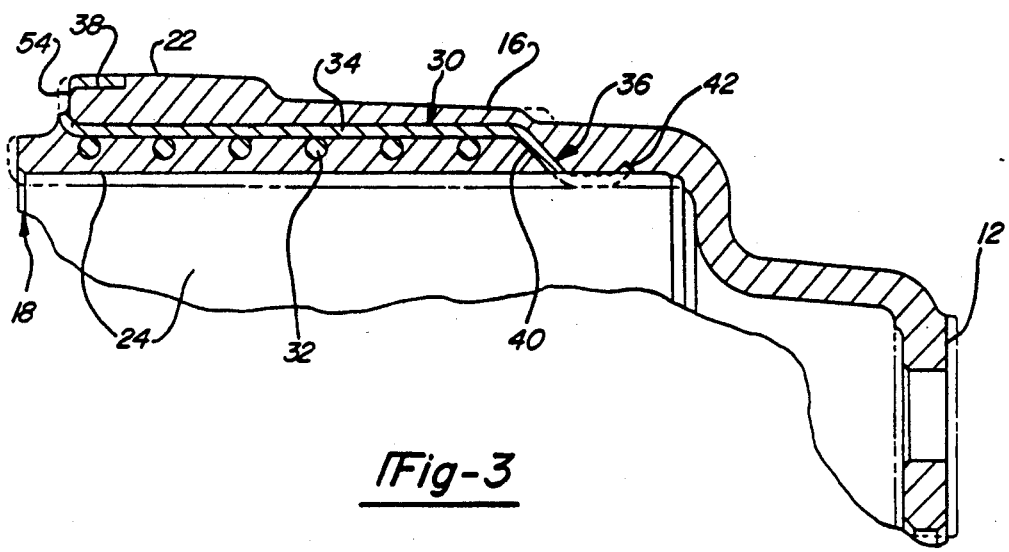
FIG. 3 is a cross-sectional view generally taken along line 3—3 in FIG. 1 showing the composite brake drum 10 after finished machining operations.

A composite brake drum in accordance with this invention is best shown in FIGS. 1 through 3 and is generally designated by reference number 10. Drum 10 has a mounting plate portion 12 configured to enable drum 10 to be mounted to a motor vehicle axle structure (not shown) for rotation about an axis of rotation 14. The mounting plate portion 12 merges into a cylindrical side portion 16, thus forming an open end 18 and a closed end 20. A so-called "squeal band" 22, formed with the outside surface of the cylindrical side portion 16, is positioned adjacent the open end 18 and is a radially thickened portion of the brake drum 10. The inside cylindrical friction surface 24 of the drum 10 is engaged by expanding the brake shoes of a conventional drum type braking system.

In describing the present invention, the terms "inward" and "outward" are to be interpreted relative to the inside and outside of the drum 10. For example, the inward direction will be generally towards the inside cylindrical friction surface 24. Likewise, the outward direction will generally be toward the cylindrical side portion 16 and the squeal band 22.

Figure 4:
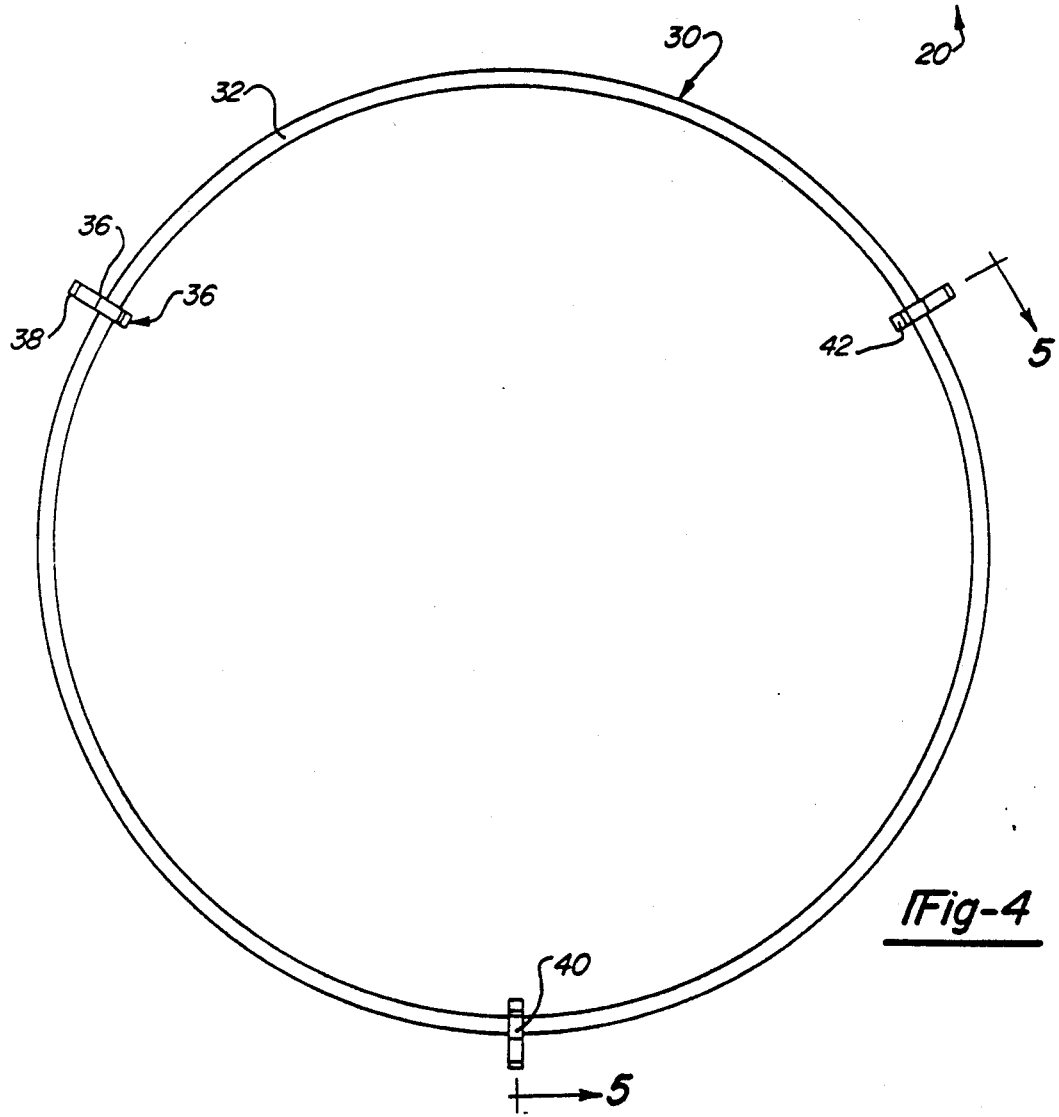
FIG. 4 is a side view of a reinforcement assembly according to this invention.

FIGS. 4 and 5 illustrate the configuration of a reinforcement assembly 30 in accordance with this invention. The reinforcement assembly 30 includes a plurality (six shown) of closed circular wire rings 32 made of steel wire stock. While individual rings are employed in the present embodiment, a single continuously wrapped wire forming loops in a general helical shape could also be used and is encompassed by the term "rings" as used herein.

Axially extending locator wires 34 are provided at circumferentially displaced positions as shown in FIG. 4. The center portion 35 of the locator wires 34 are bonded or otherwise affixed to the rings 32, for example, by brazing, welding, soldering, adhering or by forming them integrally. Locator wires 34 have a radially outwardly turned hooked end portion 38 at one axial end and a generally offset contact portion 36 at the opposing end. The offset portion 36 is offset by a riser 40 which extends generally radially inward of the axial extending locator wire 34 toward the axis of rotation 14. A contact segment 41 of the offset portion 36 then continues in a generally axial direction until terminating in an outwardly directed toe or ski-nose 42. As such, the contact portion 36 exhibits a generally outwardly concave shape.

As shown in FIG. 2, the brake drum is cast within a pair of sand cast molds halves 44 and 46 which are separated at parting line 48 and define a mold cavity 50 whose surface forms the outer shape of the brake drum 10. As shown, the reinforcement assembly 30 is positioned within the mold cavity 50 such that offset portion 36, in particular the axial extension of the contact segment 41, is in contact with only the first or male mold half 46 and the end portion 38 is fitted within a pocket 5 formed in the male mold half 46 for developing a portion of the squeal band 22.

In previous brake drums, the position of the reinforcement assembly was gaged from both of the mold halves. This resulted in it being possible for the position of the reinforcement assembly to vary along its length from the desired spacing distance, a distance measured from the friction surface, producing a non-uniform strength across the drum. The present invention overcomes this deficiency.

The reinforcement structure 30 is positioned and mounted so as to reference the location and position of the rings 32 only with respect to the male mold half 46. Accordingly, the reinforcement structure 30 is fully positioned prior to the second or female mold half 44 being assembled or closed onto the male mold half 46. By limiting contact of the locating wires 34 to only the male mold half 46, the reinforcement assembly 30 does not traverse the parting line 48 as it is positioned within the mold cavity 50 (i.e. the locator wire 34 does not extend from the first mold half 46 thereafter contacting the second mold half 44). By not crossing the parting line 48, the positioning of the rings 32 is more accurately held relative to the braking surface. As seen in FIGS. 2 and 3, by referencing the reinforcement assembly 30 to only the male mold half 46, the rings 32 are more accurately positioned relative to the raw cast of the friction surface 24. As such, the friction surface 24 can be machined and finished while maintaining the rings 32 within the acceptable tolerances, thereby providing optimum and equally distributed strength within the composite drum 10.

Since the locating wires 34 engage only the first mold half 46, it is possible to provide for a clean mold cavity 50, one absent of free or loose sand, for casting the drum 10. Whenever the reinforcement assembly 30 contacts the walls of the mold cavity, an amount of mold sand is scraped free at the place of contact. This occurs at each contact area. In the present invention, the reinforcement assembly is positioned over the male mold half 46 and the assembly 30 contacts the male mold half 46 with the opposing ends of the locator wires 34. During the positioning of the reinforcement assembly 30, any amount of sand that would be scraped free is reduced by the elongated contact segment 41 and ski-nose 42 of the offset portion 36 being connected to the remainder of the locator wire 34 by an axially and radially extending riser 40. As the reinforcement assembly is moved into its proper position, the contact segment 41 presents a rounded surface 41a for contact with the mold cavity surface and is able to slide along the mold half 46 with a rail or sledding action. In this manner, the terminal end or ski-nose 42 prohibits the contact segment 41 from being driven into the mold half 46. Likewise, the rounded corner 39 of the hooked end 38 contacts the mold half 46 in the pocket 52 with the leg 43 tapering inwardly toward the wire end 45. This enables the hooked end 38 to slide along the mold half.

Prior to the positioning of the female mold half 44 over the male mold half 46, any free sand then present in the mold cavity 50 can be cleared to provide a clean mold cavity 50 for improved casting integrity. Typically, the sand is blown clear of the cavity 50. During casting, any free sand remaining within the mold cavity 50 will result in a contaminated casting having increased defects and reduced strength. Since the locator wires 34 will not contact the female mold half 44, the female mold half 44 may be brought into position without any additional sand being released into the cavity 50. Molten iron can now be poured into the mold cavity 50 to substantially embed the reinforcement assembly 30 while readily controlling the porosity to increase the strength of the drum 10.

The offset shape of the offset contact portion 36 also allows for fine tuning or reforming of the reinforcement assembly 30 immediately prior to casting. By positioning the reinforcement assembly 30 over a solid duplicate of the mold, the orientation of the reinforcement assembly 30 can be readily checked and adjusted if necessary.

FIG. 3 is a cross-sectional view through the brake drum 10 after finish machining operations are completed. The phantom lines show the outline of the raw casting of the drum 10. As shown, the friction surface 24 is machined to form an accurate inside bore, this involves machining away the contact segment 41. Although iron is a superior material for forming the friction surface 24, the minute cross-sectional area of exposed steel caused by machining into the offset portion 36 does not produce adverse consequences along the interior surface. The rim surface 54 may be machined away causing a portion of the end portion 38 to be removed.

In previous designs, the locating ends were required to be embedded into and could disrupt the exterior surface of the cylindrical side portion 16. Since the exterior surface is subjected to extensive stress loading, it is desirable to eliminate the stress concentration induced by the presence of the machined locator ends along that surface. Additionally, the previously mentioned critical diameter is no longer necessary.

The structural benefits provided by the composite brake drum 10, as compared with conventional cast brake drums, are manyfold. The ultimate tensile strength of grey iron is much less than that of steel and, accordingly, the steel of the reinforcement assembly 30 provides enhanced mechanical strength for the drum. The structure is also stiffer since the modulus of elasticity for steel is about twice that of grey iron (i.e., 30 million psi and 15 million psi, respectively). Due to the increased modulus of elasticity of steel, the steel carries a disproportionately high fraction of the total load exerted on the brake drum as compared with its cross-sectional area. Accordingly, when steel is substituted for grey iron within the brake drum 10, the stress in the iron will be reduced and the stiffness of the composite will be enhanced as compared to a drum formed of iron alone. The benefits to be derived from such a composite structure include a reduction in the brake actuator travel of a vehicle and a higher tolerance to brake lining wear. In addition, the reduction in stress retards crack initiation and propagation.

The configuration of the reinforcement assembly 30 in accordance with this invention further provides structural benefits in that the rings 32 are located close to the friction surface 24 and can readily be held within acceptable tolerances. Although stresses are applied onto a brake drum in numerous directions, a significant load is exerted on the cylindrical side portion 16 of the drum 10 in response to the radially outward travel of the brake shoes. Such a load places a tensile stress along the friction surface 24 and a tensile stress on the outer radial surface of the drum side portion 16. The steel making up the rings 32 has excellent tensile strength in extension and, with the positioning of the rings 32 in close proximity to the friction surface 24, such forces are far better restrained than in ordinary grey iron, which has a fairly low extension tensile strength. By positioning the rings 32 substantially equidistantly from the friction surface 24 along the surface's length, the strength of the composite brake drum 10 is uniformly increased across the friction surface 24. Disjunctions in strength could result in the drum 10 exhibiting an increased susceptibility to fatigue.

With reference to FIG. 6, an alternative embodiment of the end portion 38 of the locator wires 34 is shown and designated as 38a. The end portion 38a is configured as a hook having a spring bar 60 and a contact segment 62 for engagement with the sand casting mold cavity surface 64. The end portion 38a is configured relative to the offset portion 36 at the opposite end of the locator wires so that the contact portion 62 is pressed against the sand cast mold surface 64 in the pocket 50. The spring portion 60 will be deflected slightly as the reinforcing structure is placed upon the male mold half 46. As the reinforcing structure is placed on the mold half, a portion of the casting surface 64 will be scraped away due to the contact with the contacting portion 62. After the reinforcing structure is in place, the loose sand is blown from the male mold half 46 before the mold half 44 is placed thereon. The blunt end surface 66 of the locator wire is substantially perpendicular to the contacting portion 62 and will tend to abraid the sand casting surface 64 if the reinforcing structure is moved off of the mold half 46 in the leading direction of the end surface, opposite the direction the reinforcing structure was moved into the mold half 46. The hook structure 38a, by virtue of being spring biased against the sand casting mold surface, acts to resist movement of the reinforcing structure within the mold cavity. The end portion 38a in connection with the offset portion 36 operates to precisely position both axial ends of the reinforcing structure within the mold cavity so that the resultant cast brake drum has the reinforcing rings 32 in the desired location.

The end portion 38a also enables the locator wires 34 to move radially outward as the rings 32 are thermally expanded. The contact segment 62 is axially spaced from the end 68 of the center portion 69 of the locator wire. The spring bar 60, which is inclined to the axis of the brake drum, forms a lever with the contact segment 62 facilitating bending at corner 70 as the locator wire is urged radially outward by the thermal expansion of the rings 32. The outward movement of the rings due to thermal expansion is allowed to occur evenly about the circumference of the rings resulting in the even spacing of the rings from the friction surface of the brake drum. The hook structure 38a includes a radial bar 72 extending radially from the end 68 of the locator wire center portion, the spring bar 60 extends axially and radially outwardly from the end of the radial bar 72 while the contacting segment 62 extends axially from the end of the spring bar 60. For the brake drum, a fifteen degree angle for the spring bar 60 relative to the rotational axis of the drum has provided satisfactory results.

FIG. 6a shows an alternative embodiment of the locator wire end portion in which the spring bar has been moved relative to the other components of the end portion 38b. The spring bar 60b connects directly to the end of 68 of the center portion 69 of the locator wire and extends axially and radially outward from the center portion 69. At the end of the spring bar, the radial bar 72 extends radially outwardly to the contacting segment 62 which extends substantially axially from the radial bar. This embodiment enables the radial bar 72 to be spaced outwardly further than in the previous embodiment shown in FIG. 6. This is useful in a casting in which the ledge upon which the radial bar is seated is relatively small and close to the radial outer edge of the mold cavity.

While the above description constitutes the preferred embodiments of the present invention, it will be appreciated that the invention is susceptible to modification, variation and change without departing from the proper scope and fair meaning of the accompanying claims.

What is claimed is:

1. A composite article comprising:
a body molded within a mold cavity defined by a mold cavity surface, said body having an annular portion; and
a reinforcing structure substantially embedded within said annular portion, said reinforcing structure including at least one ring extending circumferentially about said annular portion and being substantially coaxial with said annular portion; said ring being axially positioned by at least two axially extending locator wires having a center portion connected to said ring and end portions for contact with said mold cavity surface to radially position said locator wires within said mold cavity, one of said end portions forming a hook having a radial bar at the end of said locator wires and a return bent contact segment extending generally in said axial direction for contact with the mold cavity surface and a linear spring bar between said radial bar and said contact segment or between said radial bar and said center portion, said spring bar being inclined relative to said axis to form a lever arm to permit radial deflection of said center portion relative to said contact segment during molding of said molded body.

2. The composite article of claim 1 wherein said body is a cast iron brake drum.

3. The composite article of claim 1 wherein said hook extends radially outwardly from said center portion.

4. The composite article of claim 3 wherein said contact segment terminates in an end surface substantially normal to said mold cavity surface whereby upon axial movement of said reinforcing structure in the leading direction of said normal end surface, said end surface abrades said mold cavity surface.

5. Composite article comprising:
cast iron body molded within a sand casting mold defined by two mold halves each having a mold cavity surface;
a reinforcing structure substantially embedded within said cast iron body, said reinforcing structure including at least two locator wires each having two end portions for contact with a mold cavity surface of one of said mold halves, said reinforcing structure being insertable into said mold cavity by moving said reinforcing structure onto one of said mold halves in a first direction, said locator wire end portions having rounded surfaces for sliding contact with the mold cavity surface to minimize disturbance of the mold surface during insertion of said reinforcing structure in said one direction, at least one of said end portions having a blunt end surface opposite said rounded surface and substantially normal to said mold cavity surface and in engagement therewith whereby upon movement of said reinforcing structure in the opposite direction said blunt end surface abraids said sand mold cavity surface.

6. The composite article of claim 5 wherein both ends of said locator wires have blunt end surfaces substantially normal to said mold cavity surface and pressed into engagement therewith.

7. A cast composite brake drum for a motor vehicle comprising:
a mounting plate portion for mounting said drum to a motor vehicle axle structure for rotation about an axis of rotation;
a cylindrical side portion joining said mounting plate portion and defining an open end and a closed end of said drum and forming an inside cylindrical braking friction surface, said cylindrical side portion having a reinforcing structure substantially embedded therein and including at least two rings extending circumferentially about said drum and being coaxial with said axis of rotation, said rings being connected together and axially spaced relative to said axis of rotation by at least two axially extending locator wires having a center portion connected to said rings and end portions for radially positioning said locator wires within a mold cavity in which said drum is cast, one of said end portions forming a hook having a radial bar at the end of said locator wires and a return bent contact segment extending generally in said axial direction for contact with a surface of the mold cavity and a linear spring bar between said radial bar and said contact segment or between said radial bar and said center portion, said spring bar being inclined relative to said axis to form a lever arm to permit radial deflection of said center portion relative to said contact segment during casting of said brake drum.

8. The cast composite brake drum of claim 7 wherein said spring bar is inclined at an angle of approximately fifteen degrees to said axis.

9. The cast composite brake drum of claim 7 wherein said hook extends radially outwardly from said center portion.

10. The cast composite brake drum of claim 9 wherein said one end portion of said locator wires is adjacent the open end of said drum.

11. The cast composite brake drum of claim 9 wherein said contact segment terminates in a end surface substantially normal to said mold cavity surface whereby upon axial movement of said reinforcing structure in the leading direction of said normal end surface, said end surface abrades said mold cavity surface.

* * * * *